United States Patent Office 2,744,048
Patented May 1, 1956

2,744,048

SUBSTITUTED ALKYL-DIPHENYLMETHANE ANTHELMINTIC COMPOSITIONS

Arthur Henry Craige, Jr., Plainfield, Ind., assignor to Allied Laboratories, Inc., Kansas City, Mo., a corporation of Delaware No Drawing. Application January 5, 1953,
Serial No. 329,746

4 Claims. (Cl. 167—53.1)

The present invention relates to anthelmintics and is directed to novel compositions and methods for the elimination of internal parasites from domestic animals and poultry. More particularly, it relates to stock and poultry feed compositions containing as an essential active anthelmintic ingredient at least one of the compounds represented by the following general formula:

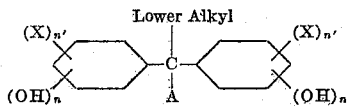

in which X represents a halogen selected from the group consisting of chlorine and bromine, $n$ is a whole number of from 1 to 2, $n'$ is a whole number from 1 to 4, and wherein said halogen and hydroxy groups on each ring are in corresponding symmetrical positions, and A represents a member of the group consisting of hydrogen and lower alkyl radicals and a carrier therefore.

In accordance with the present invention, it has been discovered that feed compositions containing in the proper amounts a compound as illustrated by the above formula are efficient anthelmintics when consumed by domestic animals and poultry infected with worms.

It is an advantage of the present invention that my compositions possess a high therapeutic index, i. e., a relatively low toxicity at the effective anthelmintic doses.

While my compositions are generally useful for the treatment of internal parasitic infestations of the alimentary tract of stock and poultry, it is an advantage that they are especially effective in the treatment of tapeworm infestations.

The active ingredients of my feed compositions can broadly be classified as alkyl-diphenylmethanes wherein each of the phenyl groups contains at least one halogen substituent and at least one hydroxy substituent. I have found that at least one halogen substituent and at least one hydroxy substituent must be present on the phenyl groups. On the other hand, other substituents, i. e., alkyl groups may also be present without destroying their anthelmintic activity.

Included among the compounds useful in accordance with my invention are the following: methyl-2,2'-dihydroxy - 5,5' - dichlorodiphenylmethane, methyl - 2,2' - dihydroxy-5,5'-dibromodiphenylmethane, methyl-2,2'-dihydroxy-3,5,3',5'-tetrachlorodiphenylmethane, methyl-2,2'-dihydroxy - 3,5,6,3',5',6' - hexachlorodiphenylmethane, methyl - 2,2' - dihydroxy - 3,5,3',5' - tetrabromodiphenylmethane, methyl - 2,2' - dihydroxy - 3,4,5,6,3',4',5',6'-octachlorodiphenylmethane, methyl - 2,2' - dihydroxy-5,5' - dibromo - 3,6,3',6' - tetrachlorodiphenylmethane, methyl - 2,2' - dihydroxy - 3,5,6,3',5',6' - hexabromodiphenylmethane and their salts including alkali metal, alkaline earth-metal, and heavy metal salts.

Likewise the corresponding compounds wherein both hydrogens on the methane linkage have been replaced by an alkyl group including those such as methyl, ethyl, propyl, butyl, or amyl. A representative compound is dimethyl - 2,2' - dihydroxy - 5,5' - dichlorodiphenylmethane.

As previously indicated, the phenyl groups may have in addition to the halogen and hydroxy groups on the ring, an alkyl group and still be useful as anthelmintics in accordance with my invention. Among such alkyl substituted compounds, may be included methyl-2,2'-4,4' - dimethyl - 5,5' - dichlorodiphenylmethane, methyl-2,2' - dihydroxy - 4,4' - dimethyl - 3,5,3',5' - tetrachlorodiphenylmethane, methyl - 2,2' - dihydroxy - 4,4' - dimethyl - 3,5,6,3',5',6' - hexachlorodiphenylmethane and related compounds having the methyl group on the ring in some position other than 4 or in more than one position as well as those wherein some or all of the chlorines are replaced by bromine, and those wherein the methyl groups are replaced by a lower alkyl group such as ethyl, propyl, butyl, or amyl and corresponding dimethyl or other dialkylmethanes.

Among those compounds having more than one hydroxy group on the phenyl rings may be included methyl-2,4,2',4' - tetrahydroxy - 5,5' - dichlorodiphenylmethane, methyl - 2,4,6,2',4',6' - hexahydroxy - 5,5' - dichlorodiphenylmethane, methyl - 2,4,2', 4' - tetrahydroxy-3,5,3',5'-tetrachlorodiphenylmethane and the corresponding bromo compounds.

Either one or both of the hydrogens on the methane linkage in foregoing compounds may be replaced by alkyl groups including methyl, ethyl, propyl, butyl, or amyl groups.

While the present invention is not limited to any particular method for the production of the new compounds used as the essential active ingredient in my anthelmintic compositions, it has been found that they can be very readily prepared by condensing the appropriate alkylaldehyde with a halogenated phenol.

In most cases, it has been found desirable to condense the appropriate alkylaldehyde with parachlorophenol or parabromophenol to produce 2,2'-alkylidine-bis(4-halophenols). These compounds can then be readily chlorinated or brominated to produce the corresponding compounds having 2,3, or 4 halogen radicals on each of the phenolic rings. Obviously, the halogen substituents may all be chlorine or bromine radicals or some of each as well as some fluorine and iodine radicals. The bromo and chloro compounds are more readily obtainable; and hence, from the commercial standpoint, they are more desirable. On the other hand, the more difficultly obtainable and more expensive fluoro and iodo compounds may be prepared when desired.

The preparation of the compounds used in my anthelmintic compositions will be described in greater detail in conjunction with the following specific example, which is merely illustrative of a preferred method of preparing a representative compound.

Preparation of 2,2'-ethylidine-bis(4-chlorophenol)

One hundred parts of concentrated sulfuric acid is poured with cooling into 28 parts of water. This is cooled to 0° to 5° C. Then 25.7 parts of p-chlorophenol is stirred into the sulfuric acid. 4.6 parts of paraldehyde is added over a three hour period. All parts are by weight. The mixture is stirred three hours after the addition of paraldehyde with the temperature at 5° or below. It is then poured into 4 or 5 times its volume of water with stirring. The solid precipitate is filtered off and dissolved in dilute sodium hydroxide, stirred with charcoal, and filtered. The product, 2,2'-ethylidine-bis(4-chlorophenol), is precipitated by neutralizing the filtrate with dilute hydrochloric acid.

In the foregoing specific example, propionaldehyde, n-butylaldehyde or other alkylaldehydes may be substituted for the paraldehyde to produce corresponding compounds having the longer alkyl chains. Similarly, parabromophenol may be substituted for the parachlorophenol to produce the corresponding bromo compounds. As previously indicated, the dihalo compounds can then be readily halogenated to produce compounds having 2,3, or 4 halogen substituents on each of the benzene rings. Specific compounds falling within the above class include 2,2' - ethylidine - bis(3,4 - dichlorophenol), 2,2' - ethylidine - bis(3,4,5 - trichlorophenol), 2,2' - ethylidine-bis(3,4,5,6-tetrachlorophenol), 2,2'-ethylidine-bis(4,5,6-trichlorophenol), 2,2'-ethylidine-bis(4,6-dichlorophenol), 2,2' - ethylidine - bis(4 - bromophenol), 2,2' - ethylidine-bis(3,4 - dibromophenol), 2,2' - ethylidine - bis(3,4,5-tribromophenol), 2,2' - ethylidine - bis(3,4,5,6 - tetrabromophenol), 2,2'-ethylidine-bis(4,5-dibromophenol), 2,2' -ethylidine - bis(4,5,6 - tribromophenol), 2,2' - ethylidine - bis(4,6 - dibromophenol), 2,2' - ethylidine - bis(4-chloro - 6 - bromophenol), 2,2' - ethylidine - bis(4-bromo-6-chlorophenol), and the corresponding propylidine, butylidine and amylidine compounds.

The phenolic group of the compounds described herein forms salts with alkali metal, alkaline earth metal, heavy metals, etc., and such salts are also included in this invention.

Toxicity studies indicate that the therapeutic ratios of my compositions are very favorable, and it is not anticipated that the effective dose will produce any untoward effects.

It is to be distinctly understood that my feed compositions are useful for combatting internal parasites of the gastro-intestinal tract of any domestic animal or fowl.

The active ingredient in my feed compositions can be varied from about 2% to 98%. It is only necessary that the active ingredient constitute a proportion such that an adequate dose will be obtained by the animals consuming the food, the percentage may, therefore, be only a fraction of a percent or several percent.

My feed compositions are prepared by mixing the alkyl diphenylmethane with any suitable feed or feed concentrate.

It is obvious that the preceding descriptions are intended to be illustrative only, and they may be varied or modified to a considerable extent without departing from the spirit of the invention or sacrificing the advantages thereof. I do not, therefore, intend to limit my invention to the specific embodiments herein set forth except as indicated in the appended claims.

This application is a continuation-in-part of my copending application Serial No. 119,999, filed October 6, 1949 which is a division of my application Serial No. 592,919, filed May 9, 1945, now both abandoned.

I claim:
1. An anthelmintic animal and poultry feed composition, comprising a stock and poultry feed, containing an effective quantity of a compound represented by the following formula:

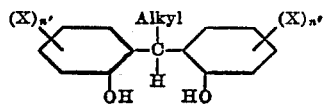

In which X represents a halogen selected from the group consisting of chlorine and bromine, said halogen substituents being arranged symmetrically, and $n'$ represents a whole integer from 1 to 4, and Alkyl represents an alkyl radical selected from the group consisting of methyl, ethyl, propyl, butyl and amyl.

2. An anthelmintic animal and poultry feed composition, comprising a stock and poultry feed, containing an effective quantity of a compound represented by the following formula:

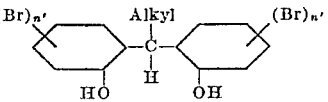

in which the bromine substituents are arranged symmetrically, $n'$ represents a whole integer from 1 to 4, and Alkyl represents an alkyl radical selected from the group consisting of methyl, ethyl, propyl, butyl and amyl.

3. An anthelmintic animal and poultry feed composition, comprising a stock and poultry feed, containing an effective quantity of a compound represented by the following formula:

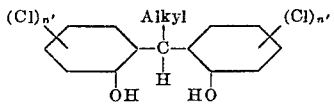

in which the chlorine substituents are arranged symmetrically, $n'$ represents a whole integer from 1 to 4, and Alkyl represents an alkyl radical selected from the group consisting of methyl, ethyl, propyl, butyl and amyl.

4. An anthelmintic animal and poultry feed composition, comprising a stock and poultry feed, containing an effective quantity of the substance represented by the following formula:

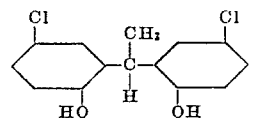

References Cited in the file of this patent
UNITED STATES PATENTS

| | | |
|---|---|---|
| 1,587,077 | Kropp | June 11, 1926 |
| 1,707,181 | Weiler et al. | Mar. 26, 1929 |
| 2,091,840 | Turnbow | Aug. 31, 1937 |
| 2,250,480 | Gump | July 29, 1941 |
| 2,272,267 | Gump | Feb. 10, 1942 |
| 2,334,408 | Gump et al. | Nov. 16, 1943 |
| 2,353,725 | Gump | July 18, 1944 |

OTHER REFERENCES

Cade: Soap and Sanitary Chemicals, vol. 20, Feb. 1944, pgs. 111–115.